United States Patent
Heo et al.

(10) Patent No.: US 12,555,801 B2
(45) Date of Patent: Feb. 17, 2026

(54) FUEL CELL, A FULL CELL VEHICLE INCLUDING THE SAME, AND A METHOD OF CONTROLLING A TEMPERATURE OF A VEHICLE

(71) Applicants: HYUNDAI MOTOR COMPANY, Seoul (KR); KIA CORPORATION, Seoul (KR)

(72) Inventors: Yong Suk Heo, Seoul (KR); Dae Han Ka, Yongin-si (KR); Hyun Woong Ko, Seoul (KR); Jae Min Ahn, Daejeon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 660 days.

(21) Appl. No.: 17/984,029

(22) Filed: Nov. 9, 2022

(65) Prior Publication Data
US 2023/0335762 A1    Oct. 19, 2023

(30) Foreign Application Priority Data
Apr. 15, 2022  (KR) .................. 10-2022-0046781

(51) Int. Cl.
*H01M 8/04007*   (2016.01)
*B60L 58/34*     (2019.01)
(Continued)

(52) U.S. Cl.
CPC ......... *H01M 8/04037* (2013.01); *B60L 58/34* (2019.02); *H01M 8/04268* (2013.01);
(Continued)

(58) Field of Classification Search
CPC ......... H01M 2220/20; H01M 2250/20; H01M 8/0267; H01M 8/04225; H01M 8/04253; H01M 8/04731; H01M 8/04888; H01M 8/248; H05N 1/0236; H05N 2203/003; H05N 2203/005; H05N 2203/016; H05N 3/145; H05N 2203/013; H05N 2203/02; H05N 3/286; Y02E 60/50; B60L 58/40
See application file for complete search history.

(56) References Cited

U.S. PATENT DOCUMENTS

2004/0131904 A1*   7/2004   Arthur .................. B01J 7/00
                                                    219/385

FOREIGN PATENT DOCUMENTS

| JP | 5764000 B2 | | 8/2015 | |
|---|---|---|---|---|
| KR | 20170037009 A | * | 4/2017 | .......... H01M 8/2485 |
| KR | 20180088095 A | * | 8/2018 | .......... H01M 8/0267 |

OTHER PUBLICATIONS

Sant et al., KR 1020170037009, Espacenet machine translation, 2017 (Year: 2017).*

* cited by examiner

*Primary Examiner* — Adam A Arciero
(74) *Attorney, Agent, or Firm* — Lempia Summerfield Katz LLC

(57) ABSTRACT

A fuel cell includes a cell stack having a plurality of unit cells stacked in a first direction, a plate disposed at at least one of two opposite ends of the cell stack, and a heating element disposed between the plate and the at least one of the two opposite ends of the cell stack. The heating element includes a plurality of heating patterns generating heat at different temperatures and the plate includes a plurality of power terminals connected to respective ones among the plurality of heating patterns.

20 Claims, 13 Drawing Sheets

(51) Int. Cl.
*H01M 8/04223* (2016.01)
*H01M 8/04302* (2016.01)
*H01M 8/0432* (2016.01)
*H01M 8/04701* (2016.01)
*H01M 16/00* (2006.01)
*H05B 1/02* (2006.01)

(52) U.S. Cl.
CPC ..... *H01M 8/04302* (2016.02); *H01M 8/0432* (2013.01); *H01M 8/04701* (2013.01); *H01M 16/006* (2013.01); *H05B 1/0236* (2013.01); *H01M 2220/20* (2013.01); *H01M 2250/20* (2013.01); *H05B 2203/003* (2013.01); *H05B 2203/005* (2013.01); *H05B 2203/016* (2013.01)

FUEL CELL, A FULL CELL VEHICLE INCLUDING THE SAME, AND A METHOD OF CONTROLLING A TEMPERATURE OF A VEHICLE

CROSS-REFERENCE TO RELATED APPLICATION

This application claims the benefit of priority to Korean Patent Application No. 10-2022-0046781, filed on Apr. 15, 2022, which is hereby incorporated by reference as if fully set forth herein.

BACKGROUND

Field of the Disclosure

Embodiments relate to a fuel cell, a fuel cell vehicle including the same, and a method of controlling the temperature of the vehicle.

Discussion of the Related Art

The performance of a cell stack included in a fuel cell of a fuel cell vehicle is determined by various conditions, such as temperature, relative humidity (RH), pressure, and flow rate. In addition, the temperature of the cell stack affects activation of reactant gases (hydrogen/oxygen), performance of cooling the inside of the cell stack, and the state (solid/liquid/gas) of water molecules. Particularly, an end cell in a cell stack inevitably has defects, making the thermal state of an end plate non-uniform. Therefore, research with the goal of solving this problem is underway.

A fuel cell includes a cell stack and a heater assembly. In winter, water inside an end cell of the cell stack freezes due to the low outdoor air temperature. Thus, electricity is not generated in the end cell, thereby deteriorating the initial startup and power generation efficiency of the fuel cell. In order to solve this problem, if the outdoor air temperature is low upon initial startup, the heater assembly is operated to heat the end cell. The heater assembly needs to perform heating to a high temperature during initial startup of the fuel cell vehicle and needs to perform heating to a low temperature while the fuel cell vehicle is traveling. However, the heater assembly is not capable of performing heating appropriately for the state of the fuel cell vehicle. Therefore, research with the goal of solving this problem is underway.

SUMMARY

Accordingly, embodiments of the present disclosure are directed to a fuel cell, a fuel cell vehicle including the same, and a method of controlling the temperature of the vehicle that substantially obviate one or more problems due to limitations and disadvantages in the related art.

Embodiments provide a fuel cell capable of increasing the temperature of a cell stack appropriately for the state of a fuel cell vehicle, a fuel cell vehicle including the same, and a method of controlling the temperature of the vehicle.

However, objects to be accomplished by the embodiments of the present disclosure are not limited to the above-mentioned objects. Other objects not mentioned herein should be clearly understood by those of ordinary skill in the art from the following description.

A fuel cell according to an embodiment may include: a cell stack including a plurality of unit cells stacked in a first direction; a plate disposed at at least one of two opposite ends of the cell stack; and a heating element disposed between the plate and the at least one of the two opposite ends of the cell stack. The heating element may include a plurality of heating patterns generating heat at different temperatures. The plate may include a plurality of power terminals connected to respective ones among the plurality of heating patterns.

For example, at least one of the plurality of heating patterns may have a serpentine shape.

For example, each of the plurality of heating patterns may have a portion extending in the horizontal direction and a portion extending in the vertical direction. The portion extending in the horizontal direction may have a greater length than the portion extending in the vertical direction. Each of the horizontal direction and the vertical direction may intersect the first direction.

For example, each of the plurality of heating patterns may have a portion extending in the vertical direction and a portion extending in the horizontal direction. The portion extending in the vertical direction may have a greater length than the portion extending in the horizontal direction. Each of the horizontal direction and the vertical direction may intersect the first direction.

For example, the plurality of heating patterns may include a first heating pattern and a second heating pattern. The first heating pattern may be surrounded by the second heating pattern.

For example, the plurality of power terminals may include a first power terminal connected to the first heating pattern and a second power terminal connected to the second heating pattern.

For example, the first heating pattern may generate a larger amount of heat than the second heating pattern. The second heating pattern may generate a larger amount of heat than the first heating pattern.

For example, the heating element may include an insulating base having the plurality of heating patterns formed thereon.

For example, the first heating pattern may include a first conductive line formed on the insulating base, a $1\text{-}1^{st}$ power connector located at one end of the first conductive line, and a $1\text{-}2^{nd}$ power connector located at the other end of the first conductive line. The second heating pattern may include a second conductive line formed on the insulating base so as to be spaced apart from the first conductive line, a $2\text{-}1^{st}$ power connector located at one end of the second conductive line, and a $2\text{-}2^{nd}$ power connector located at the other end of the second conductive line.

For example, the plate may include a $1\text{-}1^{st}$ terminal connected to the $1\text{-}1^{st}$ power connector, a $1\text{-}2^{nd}$ terminal connected to the $1\text{-}2^{nd}$ power connector, a $2\text{-}1^{st}$ terminal connected to the $2\text{-}1^{st}$ power connector, and a $2\text{-}2^{nd}$ terminal connected to the $2\text{-}2^{nd}$ power connector.

For example, the $1\text{-}1^{st}$ power connector, the $1\text{-}2^{nd}$ power connector, the $2\text{-}1^{st}$ power connector, and the $2\text{-}2^{nd}$ power connector may be disposed on a portion of the insulating base.

For example, the first power terminal may include a $1\_1^{st}$ power terminal connected to the $1\text{-}1^{st}$ terminal and a 1-2nd power terminal connected to the $1\text{-}2^{nd}$ terminal, and the second power terminal may include a $2\text{-}1^{st}$ power terminal connected to the $2\text{-}1^{st}$ terminal and a $2\text{-}2^{nd}$ power terminal connected to the $2\text{-}2^{nd}$ terminal.

For example, one of the $1\text{-}1^{st}$ power connector and the $1\_2^{nd}$ power connector and one of the $2\text{-}1^{st}$ power connector and the $2\text{-}2^{nd}$ power connector may be disposed on an upper side of the portion of the insulating base, and the remaining one of the 1-1$^{st}$ power connector and the 1-2$^{nd}$ power connector and the remaining one of the 2-1$^{st}$ power connector and the 2-2$^{nd}$ power connector may be disposed on a lower side of the portion of the insulating base.

For example, the 1-1$^{st}$ power connector, the 1-2$^{nd}$ power connector, the 2-1$^{st}$ power connector, and the 2-2$^{nd}$ power connector may be disposed on the center of the portion of the insulating base.

A fuel cell vehicle according to another embodiment may include: the fuel cell described above; a battery configured to supply voltage having a lower level than the voltage supplied from the cell stack; a first switching unit disposed between a first heating pattern, which is one of the plurality of heating patterns, and the cell stack of the fuel cell and configured to be switched in response to a first control signal; a second switching unit disposed between a second heating pattern, which is another one of the plurality of heating patterns, and the battery and configured to be switched in response to a second control signal; and a controller configured to generate the first control signal and the second control signal based on a state of the fuel cell vehicle, the state being at least one of whether the fuel cell vehicle is started up or is traveling, the outside air temperature, or the temperature inside the cell stack.

For example, the cell stack may include a first cell and a second cell respectively located at two opposite ends thereof and an intermediate cell located between the first and second end cells. The controller may include a first temperature controller configured to make a determination as to whether the outside air temperature is lower than a predetermined temperature depending on the state of the fuel cell vehicle and to generate the first control signal based on a result of the determination. The controller may further include a second temperature controller configured to make a determination as to whether the temperature difference between at least one of the first or second end cell and the intermediate cell falls outside a predetermined temperature range depending on the state of the fuel cell vehicle and to generate the second control signal based on a result of the determination.

For example, the fuel cell vehicle may further include a first sensor disposed on the heating element and configured to measure the temperature of the first or second end cell, and a second sensor disposed outside the cell stack and configured to measure the outside air temperature.

For example, the predetermined temperature may be −10° C., and the predetermined temperature range may be 5° C. to 10° C.

According to still another embodiment, a method of controlling the temperature of a fuel cell vehicle may include: determining as the state of the fuel cell vehicle whether the fuel cell vehicle is started up or is traveling; operating a heating pattern generating a relatively large amount of heat among the plurality of heating patterns when the fuel cell vehicle is started up and when the outside air temperature is lower than the predetermined temperature; and operating a heating pattern generating a relatively small amount of heat among the plurality of heating patterns when the fuel cell vehicle is traveling and when the temperature difference falls outside the predetermined temperature range.

BRIEF DESCRIPTION OF THE DRAWINGS

The accompanying drawings, which are included to provide a better understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure is now be described more fully hereinafter with reference to the accompanying drawings, in which various embodiments are shown. The examples, however, may be embodied in many different forms and the present disclosure should not be construed as being limited to the embodiments set forth herein. Rather, these embodiments are provided to make this disclosure more thorough and complete, and to more fully convey the scope of the disclosure to those of ordinary skill in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element, should be considered herein as being "configured to" meet that purpose or perform that operation or function.

Hereinafter, a fuel cell 100, a fuel cell vehicle 500 including the same, and a method 700 of controlling the temperature of the vehicle according to embodiments of the present disclosure are described with reference to the accompanying drawings. The fuel cell 100, the fuel cell vehicle 500 including the same, and the method 700 of controlling the temperature of the vehicle are described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. In other words, the x-axis, the y-axis, and the z-axis may intersect each other obliquely. Hereinafter, for convenience of description, the +x-axis direction or the −x-axis direction is referred to as a "first direction", the +y-axis direction or the −y-axis direction is referred to as a "second direction", and the +z-axis direction or the −z-axis direction is referred to as a "third direction".

Figure 1:
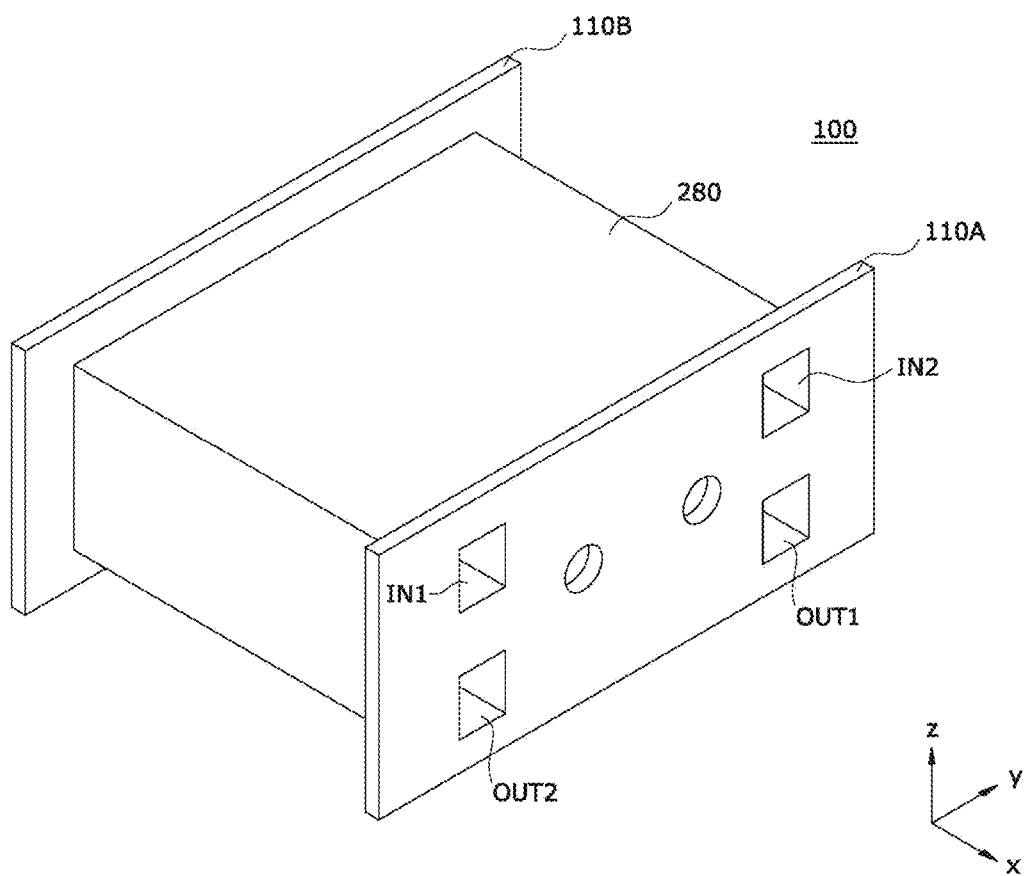
FIG. 1 is a perspective view showing the external appearance of a fuel cell according to an embodiment.
Figure 2:
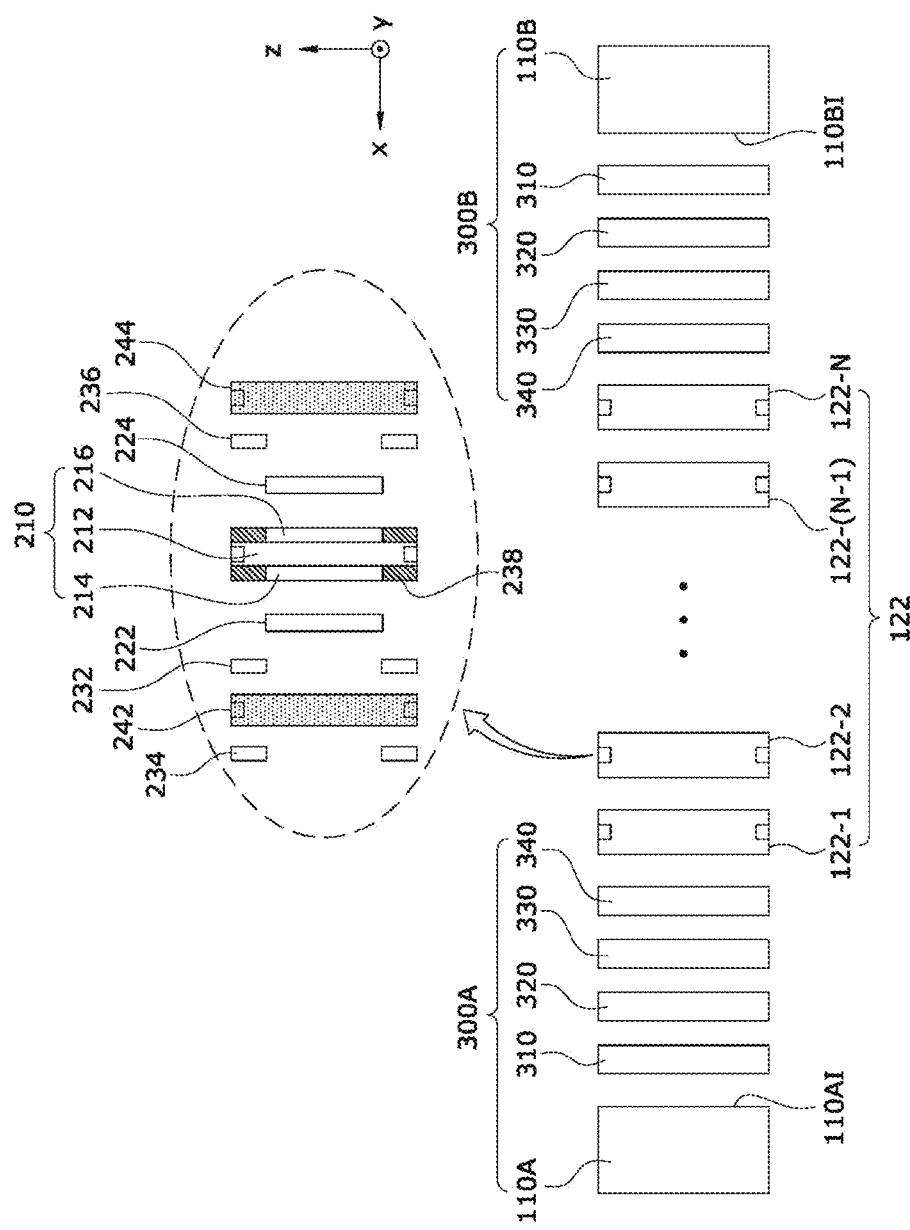
FIG. 2 is a cross-sectional view for explaining a cell stack included in the fuel cell shown in FIG. 1.

FIG. 1 is a perspective view showing the external appearance of a fuel cell 100 according to an embodiment. FIG. 2 is a cross-sectional view for explaining a cell stack (or a power generation module) 122 included in the fuel cell 100 shown in FIG. 1.

The fuel cell 100 may be, for example, a polymer electrolyte membrane fuel cell (or a proton exchange membrane fuel cell) (PEMFC), which has been studied most extensively as a power source for driving vehicles. However, the embodiments are not limited to any specific form of fuel cell.

The fuel cell 100 may include end plates (or pressing plates or compression plates) 110A and 110B, a cell stack 122, an enclosure 280, and first and second heater assemblies 300A and 300B.

The enclosure 280 shown in FIG. 1 may be coupled to the end plates 110A and 110B and may be disposed so as to surround at least part of the side portions of the cell stack 122 disposed between the end plates 110A and 110B. The enclosure 280 may serve to clamp a plurality of unit cells together with the end plates 110A and 110B in the first direction. In other words, the clamping pressure of the cell stack 122 may be maintained by the end plates 110A and 110B, which have rigid body structures, and the enclosure 280. However, the clamping pressure of the cell stack 122 may be maintained using a clamping bar (not shown) or the like, rather than using the enclosure 280. The embodiments are not limited to any specific configuration for maintaining the clamping pressure.

The end plates 110A and 110B may be disposed at respective ends of the cell stack 122 and may support and fix a plurality of unit cells. In other words, the first end plate 110A may be disposed at one of the two end portions of the cell stack 122, and the second end plate 110B may be disposed at the other of the two end portions of the cell stack 122.

The fuel cell 100 may include a plurality of manifolds. The manifolds may include a first inflow communication portion (or a first inlet manifold) IN1, a second inflow communication portion (or a second inlet manifold) IN2, a third inflow communication portion (or a third inlet manifold), a first outflow communication portion (or a first outlet manifold) OUT1, a second outflow communication portion (or a second outlet manifold) OUT2, and a third outflow communication portion (or a third outlet manifold).

One of the first and second inflow communication portions IN1 and IN2 may correspond to a hydrogen inlet through which hydrogen, which is a reactant gas, is introduced into the cell stack 122 from the outside, and the other of the first and second inflow communication portions IN1 and IN2 may correspond to an oxygen inlet through which oxygen, which is a reactant gas, is introduced into the cell stack 122 from the outside. In addition, one of the first and second outflow communication portions OUT1 and OUT2 may correspond to a hydrogen outlet through which hydrogen, which is a reactant gas, and condensed water are discharged out of the cell stack 122. The other of the first and second outflow communication portions OUT1 and OUT2 may correspond to an oxygen outlet through which oxygen, which is a reactant gas, and condensed water are discharged out of the cell stack 122.

For example, the first inflow communication portion IN1 may correspond to a hydrogen inlet and the second inflow communication portion IN2 may correspond to an oxygen inlet. The first outflow communication portion OUT1 may correspond to a hydrogen outlet, and the second outflow communication portion OUT2 may correspond to an oxygen outlet.

In addition, the third inflow communication portion may correspond to a coolant inlet through which a cooling medium (e.g., coolant) is introduced from the outside, and the third outflow communication portion may correspond to a coolant outlet through which a cooling medium is discharged to the outside.

The first and second outflow communication portions OUT1 and OUT2 may be disposed below the first and second inflow communication portions IN1 and IN2. The first inflow communication portion IN1 and the first outflow communication portion OUT1 may be disposed at positions separated from each other in an oblique direction. The second inflow communication portion IN2 and the second outflow communication portion OUT2 may be disposed at positions separated from each other in an oblique direction. Due to this arrangement of the first and second inflow communication portions IN1 and IN2 and the first and second outflow communication portions OUT1 and OUT2, condensed water may be discharged from the lower portions of the unit cells included in the cell stack 122 or may remain in the lower portions of the unit cells due to gravity.

According to one embodiment, the first and second inflow communication portions IN1 and IN2 and the first and second outflow communication portions OUT1 and OUT2 may be included in any one of the first and second end plates 110A and 110B (e.g., the first end plate 110A, as shown in FIG. 1), and the third inflow communication portion and the third outflow communication portion may be included in the other of the first and second end plates 110A and 110B (e.g. the second end plate 110B shown in FIG. 1).

According to another embodiment, all of the first to third inflow communication portions and the first to third outflow communication portions may be included in any one of the first and second end plates 110A and 110B.

Referring to FIG. 2, the cell stack 122 may include a plurality of unit cells 122-1 to 122-N, which are stacked in the first direction. Here, "N" is a positive integer of 1 or greater and may range from several tens to several hundreds. "N" may be determined depending on the intensity of the power to be supplied from the fuel cell 100 to a load. Here, "load" may refer to a part requiring power in a fuel cell vehicle that uses the fuel cell.

Each unit cell 122-$n$ may include a membrane electrode assembly (MEA) 210, gas diffusion layers (GDLs) 222 and 224, gaskets 232, 234, and 236, and separators (or bipolar plates) 242 and 244. Here, $1 \leq n \leq N$.

The membrane electrode assembly 210 has a structure in which catalyst electrode layers, in which electrochemical reactions occur, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242. Air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. In other words, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensed water" or "product water"). The condensed water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. In other words, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242 and may be electrically conductive.

The second gas diffusion layer 224 may serve to diffuse and uniformly distribute air supplied as a reactant gas through the second separator 244 and may be electrically conductive.

Each of the first and second gas diffusion layers 222 and 224 may be a microporous layer in which fine carbon fibers are combined. However, the embodiments are not limited to any specific forms of the first and second gas diffusion layers 222 and 224.

The gaskets 232, 234, and 236 serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234, and 236, the flatness of the surfaces that are adjacent to the cell stack 122, which generates electric power, may be secured, and thus surface pressure may be distributed uniformly over the reaction surfaces of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to a current collector 340.

The separators 242 and 244 may be respectively disposed outside the gas diffusion layers 222 and 224. In other words, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e., a passage or a flow path) is formed so that hydrogen is capable of flowing therethrough.

The second separator 244 serves to supply air as a reactant gas to the air electrode 216 through the second gas diffusion layer 224. To this end, the second separator 244 may include a cathode plate (CP), in which a channel is formed so that air containing oxygen is capable of flowing therethrough. In addition, each of the first and second separators 242 and 244 may form a channel through which a cooling medium is capable of flowing.

Further, the separators 242 and 244 may be made of a graphite-based material, a composite graphite-based material, or a metal-based material. However, the embodiments are not limited to any specific material of the separators 242 and 244.

For example, each of the first and second separators 242 and 244 may include the first to third inflow communication portions and the first to third outflow communication portions.

In other words, the reactant gases required for the membrane electrode assembly 210 may be introduced into the cell through the first and second inflow communication portions IN1 and IN2, and gas or liquid, in which the reactant gases humidified and supplied to the cell and the condensed water generated in the cell are combined, may be discharged to the outside of the fuel cell 100 through the first and second outflow communication portions OUT1 and OUT2.

Each of the first and second end plates 110A and 110B may be configured such that a metal insert is surrounded by a resin material. Here, the resin material may be a synthetic resin-rubber-based material or plastic. The embodiments are not limited to any specific kind of resin material. The metal portion of each of the first and second end plates 110A and 110B may have high rigidity to withstand internal surface pressure and may be formed by machining a metal material. For example, the first and second end plates 110A and 110B may be formed by combining a plurality of plates, but the embodiments are not limited to any specific configuration of the first and second end plates 110A and 110B.

In addition, the fuel cell 100 may further include a heater assembly. The heater assembly serves to raise the temperature of the cell stack 122 when the cell stack 122 in a cooled state starts to operate (i.e., is being started up) or while a fuel cell vehicle 500, which is described below, is traveling. To this end, the heater assembly may include at least one of a first heater assembly 300A or a second heater assembly 300B.

For example, as shown in FIG. 2, the heater assembly may include both the first heater assembly 300A and the second heater assembly 300B. Alternatively, unlike what is shown in FIG. 2, the heater assembly may include only one of the first heater assembly 300A and the second heater assembly 300B.

The first heater assembly 300A may be disposed between the first end cell 122-1, which is located at one of the two end portions of the cell stack 122, and an inner surface 110AI of the first end plate 110A. The second heater assembly 300B may be disposed between the $N^{th}$ end cell 122-N, which is located at the other of the two end portions of the cell stack 122, and an inner surface 110BI of the second end plate 110B.

According to one embodiment, as shown in FIG. 2, each of the first and second heater assemblies 300A and 300B may include a current collector 340, a heating element (a heater or a planar heating element) 330, and a heater plate (or a bypass plate) 310. In addition, as shown in FIG. 2, each of the first and second heater assemblies 300A and 300B may further include a pad (an insulation pad or a silicon pad) 320.

For better understanding of the positions at which the current collector 340, the heating element 330, the pad 320, and the heater plate 310 are disposed, the current collector 340, the heating element 330, the pad 320, and the heater plate 310 are illustrated schematically in FIG. 2, and the concrete configurations of these components 310, 330, and 340 are described below with reference to FIGS. 3-8.

According to another embodiment, unlike what is shown in FIG. 2, each of the first and second heater assemblies 300A and 300B may include the current collector 340, the heating element 330, the pad 320, and the end plates 110A and 110B. In other words, unlike the above embodiment, according to this embodiment, the first end plate 110A serves as the heater plate 310 of the first heater assembly 300A, and the second end plate 110B serves as the heater plate 310 of the second heater assembly 300B, so the heater plate 310 may be omitted from each of the first and second heater assemblies 300A and 300B. With this exception, since the first and second heater assemblies 300A and 300B according to this embodiment are the same as the first and second heater assemblies 300A and 300B according to the above embodiment, a duplicate description thereof has been omitted.

Hereinafter, the first and second heater assemblies 300A and 300B are described with reference to FIG. 2. The following description of the first and second heater assemblies 300A and 300B shown in FIG. 2 may also apply to the case in which each of the end plates 110A and 110B serves as the heater plate 310.

The current collector 340 may be disposed between each of the first and second end plates 110A and 110B, which face the cell stack 122, and the cell stack 122.

In other words, the current collector 340 included in the first heater assembly 300A may be disposed between the heating element 330 and one (e.g., 122-1) of the two end portions of the cell stack 122. The current collector 340 included in the second heater assembly 300B may be disposed between the heating element 330 and the other (e.g., 122-N) of the two end portions of the cell stack 122.

The current collector 340 serves to collect electrical energy generated by the flow of electrons in the cell stack 122 and to supply the same to the load of the vehicle in which the fuel cell 100 is used. For example, the current collector 340 may be implemented as a metal plate, which is made of an electrically conductive material, and may be electrically connected to the cell stack 122.

The heating element 330 may be disposed between at least one of the two end portions of the cell stack 122 and the plates (i.e., the end plates 110A and 110B). For example, referring to FIG. 2, the heating element 330 of the first heater assembly 300A may be disposed between one (e.g., 122-1) of the two end portions of the cell stack 122 and the first end plate 110A, and the heating element 330 of the second heater assembly 300B may be disposed between the other (e.g., 122-N) of the two end portions of the cell stack 122 and the second end plate 110B.

Although not shown in the drawings, thermal grease or a thermal pad may be interposed between the heating element 330 and the current collector 340 so as to be in close contact therewith. Due to the thermal pad or the thermal grease interposed between the heating element 330 and the current collector 340 in order to improve the heat conduction function, the heat generated by the heating element 330 may be efficiently transferred to the reaction cells 122-$n$ of the cell stack 122 via the current collector 340.

The pad 320 may block the heat generated by the heating element 330 from traveling in the direction in which the cell stack 122 faces the end plates 110A and 110B and may thus cause a larger amount of heat to travel to the cell stack 122. In this way, the pad 320 may exhibit a thermal insulation function of preventing heat loss. In addition, the pad 320 may also serve to buffer the clamping pressure of the cell stack 122. To this end, the pad 320 may be disposed between the end plates 110A and 110B and the heating element 330. For example, the pad 320 may be implemented as a foamed silicon sheet and may prevent damage to the film-type heating element 330 when assembled with the heater plate 310 and the heating element 330 so as to be stacked in close contact therewith. However, the embodiments are not limited to any specific material of the pad 320. Alternatively, the pad 320 may be omitted from the fuel cell 100 according to the embodiment.

The heater plate 310 is conceptually a dummy cell, which is a unit cell disposed at the outermost position in the direction in which the unit cells 122-$n$ are stacked in the cell stack 122. The heater plate 310 may be formed in the shape of a plate corresponding to the external shape of the unit cells 122-$n$.

In addition, the heater plate 310 may have communication portions penetrating both side surfaces thereof in the first direction, for example, the first and second inflow communication portions IN1 and IN2 and the first and second outflow communication portions OUT1 and OUT2.

In addition, the heater plate 310 may be implemented as a single plate, as shown in the drawings.

Alternatively, unlike what is shown in the drawings, the heater plate 310 may be configured such that a plurality of unit heater plates, e.g., three unit heater plates, is stacked in the first direction. Similar to the membrane electrode assembly 210 in which the fuel electrode 214, the polymer electrolyte membrane 212, and the air electrode 216 are assembled into an integral form, the three unit heater plates constituting the heater plate 310 may be stacked in the first direction.

The heater plate 310 may be disposed at at least one of the two end portions 122-1 and 122-N of the cell stack 122. For example, as shown in FIG. 2, the heater plate 310 of the first heater assembly 300A may be disposed between the first end plate 110A and one (e.g., 122-1) of the two end portions of the cell stack 122, and the heater plate 310 of the second heater assembly 300B may be disposed between the second end plate 110B and the other (e.g., 122-N) of the two end portions of the cell stack 122.

In addition, the heater plate 310 may be configured such that a metallic pipe is integrally formed with a plastic body through an insert injection molding method, and the pipe may form flow channels (e.g., a hydrogen channel and an oxygen channel). However, the embodiments are not limited to any specific material of the heater plate 310.

Hereinafter, an embodiment of each of the first and second heater assemblies 300A and 300B is described in more detail with reference to the accompanying drawings. For convenience of description, the first heater assembly 300A is described. However, the following description of the first heater assembly 300A may also apply to the second heater assembly 300B.

Figure 3:
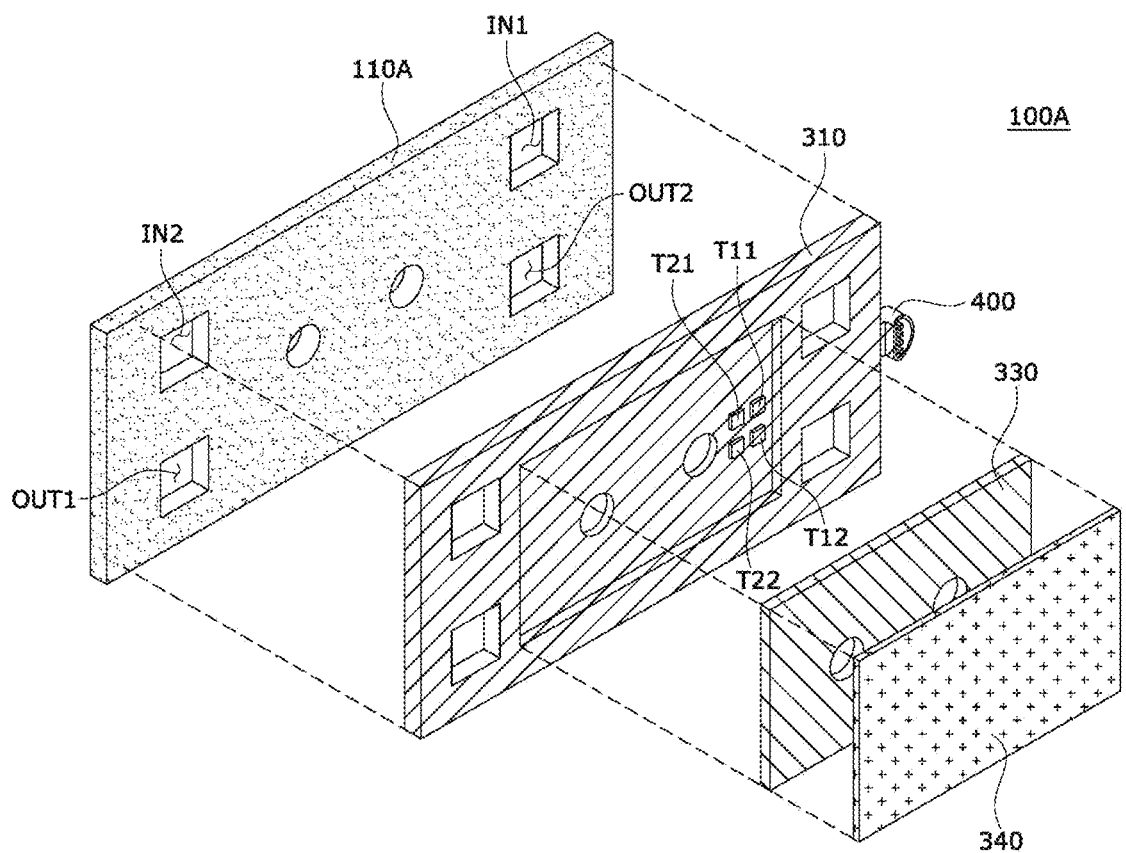
FIG. 3 is an exploded perspective view of a first heater assembly according to an embodiment.
Figure 4:
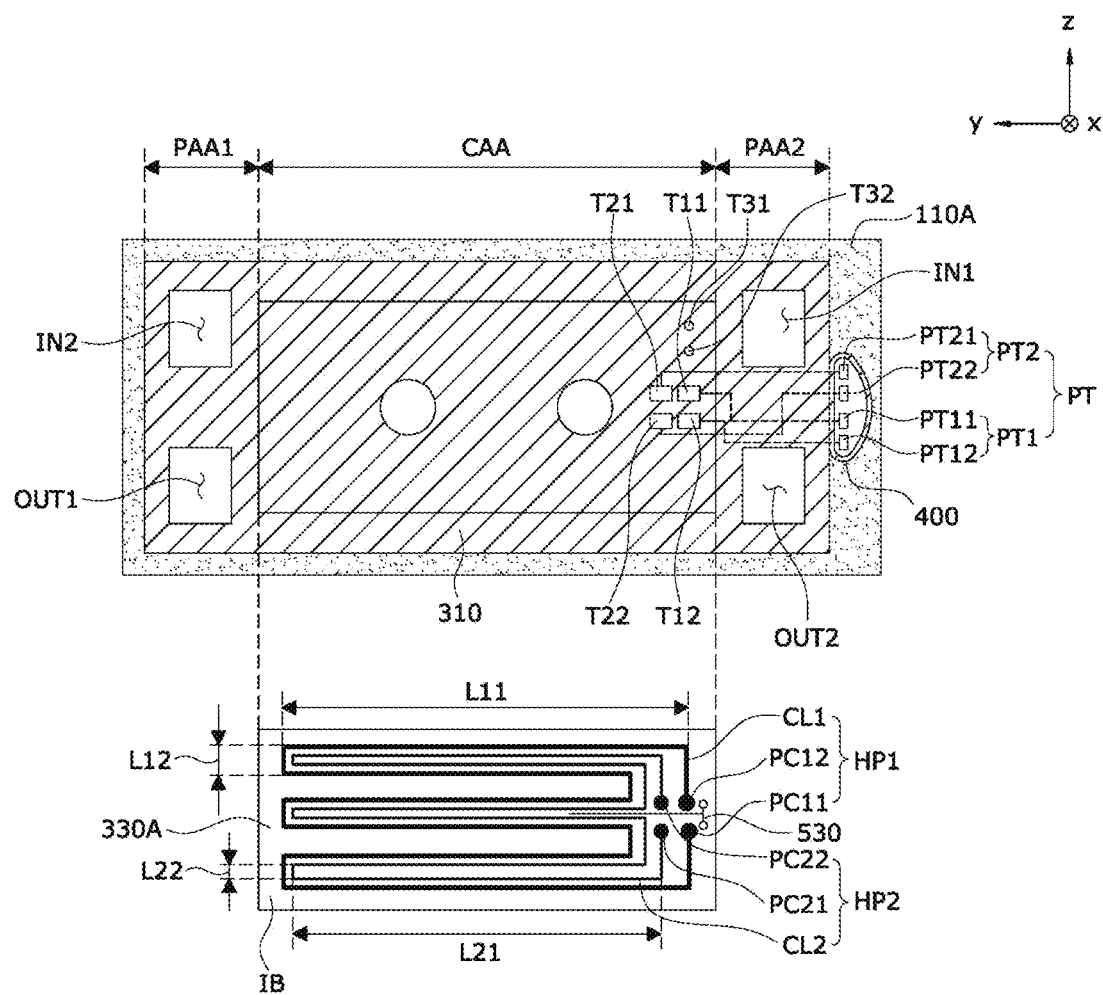
FIG. 4 is a view of the first heater assembly according to the embodiment when viewed in a first direction.

FIG. 3 is an exploded perspective view of the first heater assembly 300A according to an embodiment. FIG. 4 is a view of the first heater assembly 300A according to the embodiment when viewed in the first direction. Illustration of the pad 320 is omitted from FIG. 3.

The first heater plate 310 may include a central area CAA and peripheral areas PAA1 and PAA2. The central area CAA is an area in which the heating element 330 is disposed, and the peripheral areas PAA1 and PAA2 are areas formed near the central area CAA.

Figure 5:
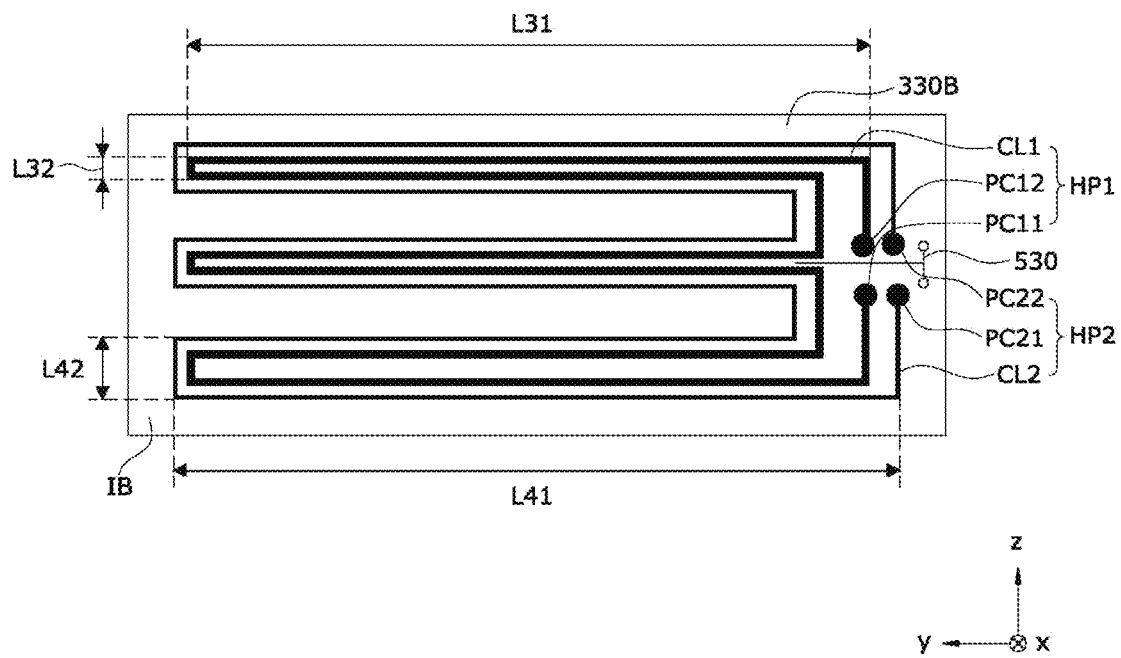
FIGS. 5-8 are views showing heating elements according to embodiments when viewed in the first direction.
Figure 6:
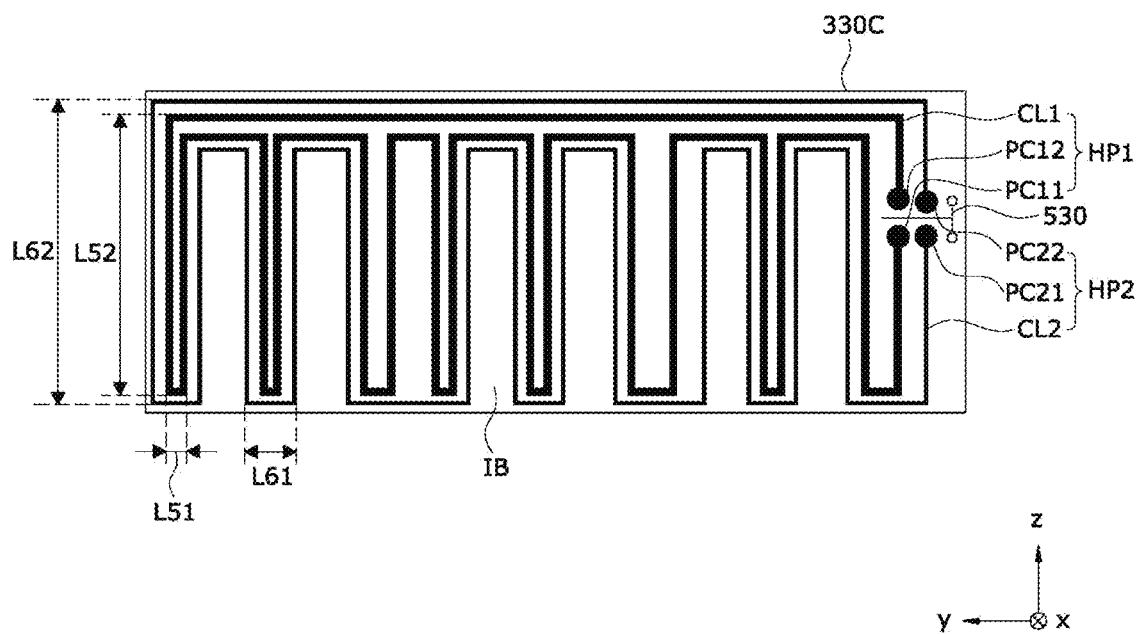
Figure 7:
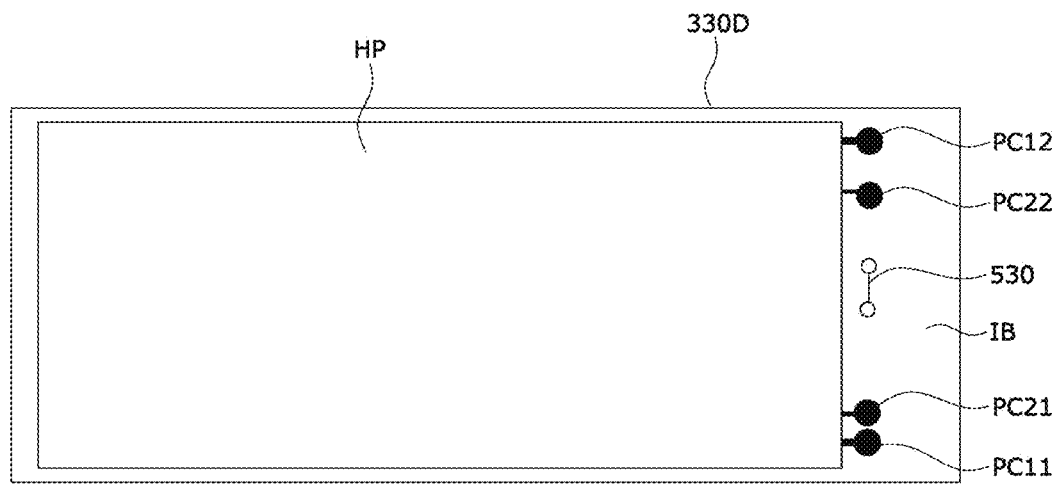
Figure 7:
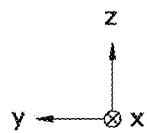
Figure 8:
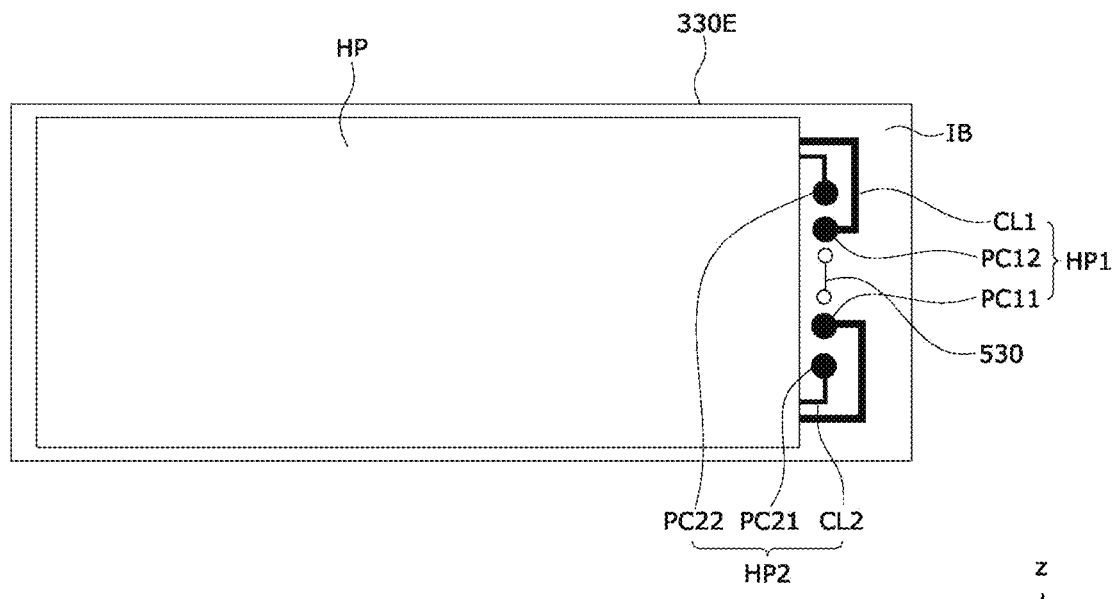
Figure 8:
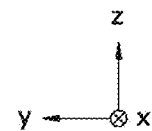

FIGS. 5-8 are views showing heating elements 300B-300E according to embodiments when viewed in the first direction. The portion indicated by "HP" in each of FIGS. 7 and 8 is an area in which a heating pattern is disposed. Because a heating pattern having any one of various shapes, for example, the shapes shown in FIGS. 4-6, can be disposed in the portion indicated by "HP", the same is depicted in the drawings as an empty area.

According to an embodiment, the heating element may include a plurality of heating patterns, which generate heat at different temperatures from each other. In other words, the amount of heat generated by a first heating pattern HP1, which is one of the plurality of heating patterns, may be greater or less than the amount of heat generated by a second heating pattern HP2, which is the other of the plurality of heating patterns. Hereinafter, for better understanding, the following description is made on the assumption that the amount of heat generated by the first heating pattern HP1 is greater than the amount of heat generated by the second heating pattern HP2.

According to an embodiment, at least one of the plurality of heating patterns may have a serpentine shape. For example, as shown in FIGS. 4-8, each of the first and second heating patterns HP1 and HP2 may have a serpentine shape.

According to an embodiment, the length of a portion of each of the plurality of heating patterns that extends in the horizontal direction may be greater than the length of a portion thereof that extends in the vertical direction. Each of the horizontal direction and the vertical direction may be a direction intersecting the first direction. The horizontal direction may correspond to the second direction, and the vertical direction may correspond to the third direction. For example, as shown in FIGS. 4 and 5, the length L11 or L31 of a portion of the first heating pattern HP1 that extends in the horizontal direction may be greater than the length L12 or L32 of a portion thereof that extends in the vertical direction, and the length L21 or L41 of a portion of the second heating pattern HP2 that extends in the horizontal direction may be greater than the length L22 or L42 of a portion thereof that extends in the vertical direction.

According to another embodiment, the length of a portion of each of the plurality of heating patterns that extends in the vertical direction may be greater than the length of a portion thereof that extends in the horizontal direction. For example, as shown in FIG. 6, the length L52 of a portion of the first heating pattern HP1 that extends in the vertical direction may be greater than the length L51 of a portion thereof that extends in the horizontal direction, and the length L62 of a portion of the second heating pattern HP2 that extends in the vertical direction may be greater than the length L61 of a portion thereof that extends in the horizontal direction.

In addition, according to an embodiment, one of the plurality of heating patterns may have a shape that is surrounded by the other thereof. For example, as shown in FIGS. 5 and 6, the first heating pattern HP1 may have a shape that is surrounded by the second heating pattern HP2. Alternatively, as shown in FIG. 4, the second heating pattern HP2 may have a shape that is surrounded by the first heating pattern HP1.

For example, the heating element 330 may include a heating part, which is composed of carbon paste and an electrode, and a protective film part, which is configured such that a polyethylene terephthalate (PET) layer disposed on both surfaces of the heating part, an aluminum layer disposed on both surfaces of the PET layer, and a PET layer disposed on both surfaces of the aluminum layer are sequentially stacked.

Further, in the heating element 330, a plurality of heating patterns, each of which is composed of carbon paste and an electrode, may be variously formed, and the heat density may be adjusted for each part by changing each heating pattern. Furthermore, the heating element 330 may be implemented as a planar heating element, for example, a polymer positive temperature coefficient (PTC) heating element. If moisture permeates the carbon paste having a PTC function for a long time, heat generation performance is deteriorated. In order to prevent entry of moisture, a PET film is attached to the carbon paste and the electrode, thereby improving resistance to moisture.

When the heating element 330 is a planar heating element, the area of the heating element 330 may be equal to the area of a reaction surface. Here, the reaction surface is the surface on which an electrical/chemical reaction occurs.

In particular, the heating element 330 may be further provided with an aluminum thin film and a PET film, which have high resistance to moisture. In this case, in order to prevent the withstand voltage performance from being deteriorated by aluminum, which is conductive, the aluminum thin film may be manufactured to a smaller size than the PET film, thereby improving not only moisture resistance characteristics but also withstand voltage characteristics.

Further, the material of the first heating pattern HP1 and the material of the second heating pattern HP2 may be the same as or different from each other. The material of each of the first heating pattern HP1 and the second heating pattern HP2 may be metal, carbon fiber, ceramic, or glass fiber. In particular, when the heating element 330 is a planar heating element, the heating element 330 is formed in a thin plate shape, and thus the material of each of the first heating pattern HP1 and the second heating pattern HP2 may be a metal-based or carbon-based material.

For example, the material of the heating element 330 may be selected based on the heat generation scheme or heat generation characteristics of each material, as shown in Table 1 below.

TABLE 1

| Classification | Quartz Tube | Halogen | Carbon | Near-Infrared Radiation |
|---|---|---|---|---|
| Heating Element | Nickel-Chromium Hot Wire | Halogen Lamp | Carbon Fiber | Specially Coated Lamp |
| Scheme | Radiant Heat | Radiant Heat | Generation of Heat by Carbon Fiber | Heat Transfer through Skin, rather than Air |
| Characteristics | Slow Heat Generation | Frequent Damage to Lamp, Fast Heat Generation/Cooling (Heat Loss) | No Odor, No Smoke, High Thermal Efficiency | Transfer of Heat over Long Distance, High Cost of Maintenance, Alleviation of Articular/Muscular Pain |

In addition, the heating element may include an insulating base IB, on which a plurality of heating patterns is formed.

In this case, the first heating pattern HP1 may include a first conductive line CL1, a 1-$1^{st}$ power connector PC11, and a 1-$2^{nd}$ power connector PC12.

The first conductive line CL1 is formed on the insulating base IB, the 1-$1^{st}$ power connector PC11 is located at one end of the first conductive line CL1, and the 1-$2^{nd}$ power connector PC12 is located at the other end of the first conductive line CL1.

In this case, the second heating pattern HP2 may include a second conductive line CL2, a 2-$1^{st}$ power connector PC21, and a 2-$2^{nd}$ power connector PC22.

The second conductive line CL2 is formed on the inserting base IB so as to be spaced apart from the first conductive line CL1, the 2-$1^{st}$ power connector PC21 is located at one end of the second conductive line CL2, and the 2-$2^{nd}$ power connector PC22 is located at the other end of the second conductive line CL2.

According to an embodiment, as shown in FIGS. 4-8, the 1-$1^{st}$ power connector PC11, the 1-$2^{nd}$ power connector PC12, the 2-$1^{st}$ power connector PC21, and the 2-$2^{nd}$ power connector PC22 may be disposed on a portion of the insulating base IB.

In one example, as shown in FIGS. 4-6, the 1-$1^{st}$ power connector PC11, the 1-$2^{nd}$ power connector PC12, the 2-$1^{st}$ power connector PC21, and the 2-$2^{nd}$ power connector PC22 may be disposed on the center of the portion of the insulating base IB.

In another example, one of the 1-$1^{st}$ power connector PC11 and the 1-$2^{nd}$ power connector PC12 and one of the 2-$1^{st}$ power connector PC21 and the 2-$2^{nd}$ power connector PC22 may be disposed on an upper side of the portion of the insulating base IB, and the other of the 1-$1^{st}$ power connector PC11 and the 1-$2^{nd}$ power connector PC12 and the other of the 2-$1^{st}$ power connector PC21 and the 2-$2^{nd}$ power connector PC22 may be disposed on a lower side of the portion of the insulating base IB.

For example, as shown in each of FIGS. 7 and 8, the 1-$2^{nd}$ power connector PC12 and the 2-$2^{nd}$ power connector PC22 may be disposed on an upper side of the portion of the insulating base IB, and the 1-$1^{st}$ power connector PC11 and the 2-$1^{st}$ power connector PC21 may be disposed on a lower side of the portion of the insulating base IB.

Meanwhile, the plate, for example, the heater plate 310 (or the end plates 110A and 110B), may include a plurality of power terminals, which are respectively connected to the plurality of heating patterns.

For example, as shown in FIG. 4, when the plurality of heating patterns includes the first and second heating patterns HP1 and HP2, the plurality of power terminals PT may include first and second power terminals PT1 and PT2.

The first power terminal PT1 may be connected to the first heating pattern HP1, and the second power terminal PT2 may be connected to the second heating pattern HPT2. To this end, the first power terminal PT1 may include 1-$1^{st}$ and 1-$2^{nd}$ power terminals PT11 and PT12, the second power terminal PT2 may include 2-$1^{st}$ and 2-$2^{nd}$ power terminals PT21 and PT22, and the heater plate 310 may include 1-$1^{st}$, 1-$2^{nd}$, 2_$1^{st}$, and 2-$2^{nd}$ terminals T11, T12, T21, and T22.

The 1-$1^{st}$ power terminal PT11 may be connected to the 1_$1^{st}$ terminal T11. The 1-$2^{nd}$ power terminal PT12 may be connected to the 1-$2^{nd}$ terminal T12. The 2-$1^{st}$ power terminal PT21 may be connected to the 2-$1^{st}$ terminal T21. The 2-$2^{nd}$ power terminal T22 may be connected to the 2-$2^{nd}$ terminal T22. The first power terminal PT1 and the second power terminal PT2 may be exposed to the outside through the connector 400.

In other words, the 1-$1^{st}$ terminal T11 may be connected to the 1-$1^{st}$ power connector PT11, the 1-$2^{nd}$ terminal T12 may be connected to the 1-$2^{nd}$ power connector PT12, the 2-$1^{st}$ terminal T21 may be connected to the 2-$1^{st}$ power connector PT21, and the 2-$2^{nd}$ terminal T22 may be connected to the 2-$2^{nd}$ power connector PT22.

In addition, when a first sensor 530 shown in FIG. 10, which is described below, is disposed on the heating element 330A, 330B, or 330C, as shown in FIGS. 4-6, 3-$1^{st}$ and 3-$2^{nd}$ terminals T31 and T32, which are connected to the first sensor 530, may be disposed on the heater plate 310.

Hereinafter, a vehicle according to an embodiment including the fuel cell 100 described above (hereinafter referred to as a "fuel cell vehicle") is described with reference to the accompanying drawings.

Figure 9:
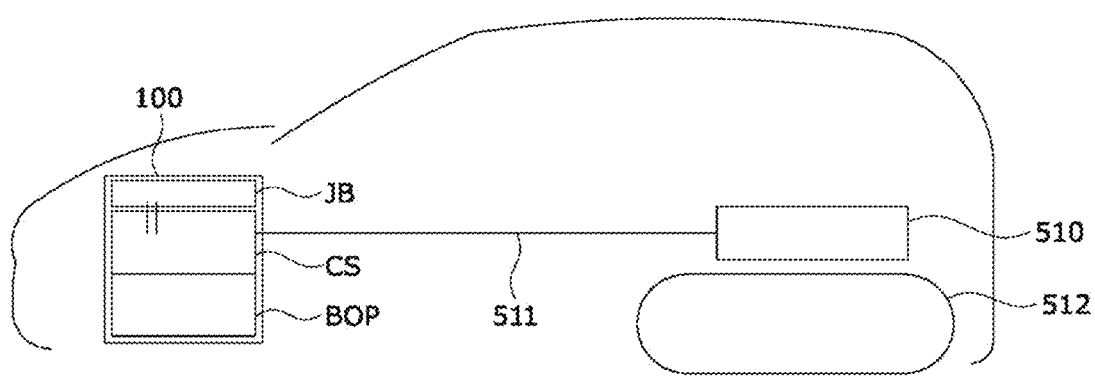
FIG. 9 is a side view schematically showing the external appearance of a fuel cell vehicle according to an embodiment.

FIG. 9 is a side view schematically showing the external appearance of a fuel cell vehicle 500 according to an embodiment.

The fuel cell vehicle 500 shown in FIG. 9 may include a fuel cell 100, a battery 510, and a fuel tank 512. Although it is illustrated in FIG. 9 that the fuel cell 100 is disposed at the front side of the fuel cell vehicle 500 and the battery 510 and the fuel tank 512 are disposed at the rear side of the fuel cell vehicle 500, the embodiments are not limited to any specific positions of these parts 100, 510, and 512.

The fuel cell 100 shown in FIG. 9 corresponds to the fuel cell 100 shown in FIGS. 1-8. In other words, the cell stack CS of the fuel cell 100 may correspond to the cell stack 122 shown in FIG. 2.

In addition, the fuel cell 100 may further include a high-voltage junction box JB (a power distributor or a junction box) and peripheral auxiliary device (balance-of-plant (BOP)). Here, the current collector 340 and the first power terminal PT1 may be connected to the high-voltage junction box JB via a terminal block (not shown). The high-voltage junction box JB may include fuses (not shown) and relays (not shown) to control the peripheral auxiliary devices (balance-of-plant (BOP)) assisting in the operation of the fuel cell 100.

The peripheral auxiliary devices (balance-of-plant (BOP)) may serve to assist in the operation of the fuel cell 100 and may include electric parts, such as parts for convenience systems of the vehicle, in addition to valves.

The battery 510 serves to supply voltage having a lower level than the voltage supplied from the cell stack CS. For example, through a line (or a wire) 511, the voltage supplied from the cell stack CS may be charged to the battery 510, or the low-level voltage stored in the battery 510 may be supplied to the second heating pad HP2 located at the front side of the fuel cell vehicle 500.

For example, when the level of the voltage supplied from the cell stack CS ranges from 250 volts to 440 volts, the amount of heat generated by the first heating pattern HP1 may range from 550 watts (W) to 800 W. In addition, when the level of the voltage supplied from the battery 510 is 12 volts, the amount of heat generated by the second heating pattern HP2 may range from 100 W to 250 W.

The fuel tank 512 serves to store hydrogen fuel and to supply the stored hydrogen fuel to the cell stack CS. Illustration of a pipe through which the hydrogen fuel is supplied from the fuel tank 512 to the cell stack CS is omitted from FIG. 9.

Figure 10:
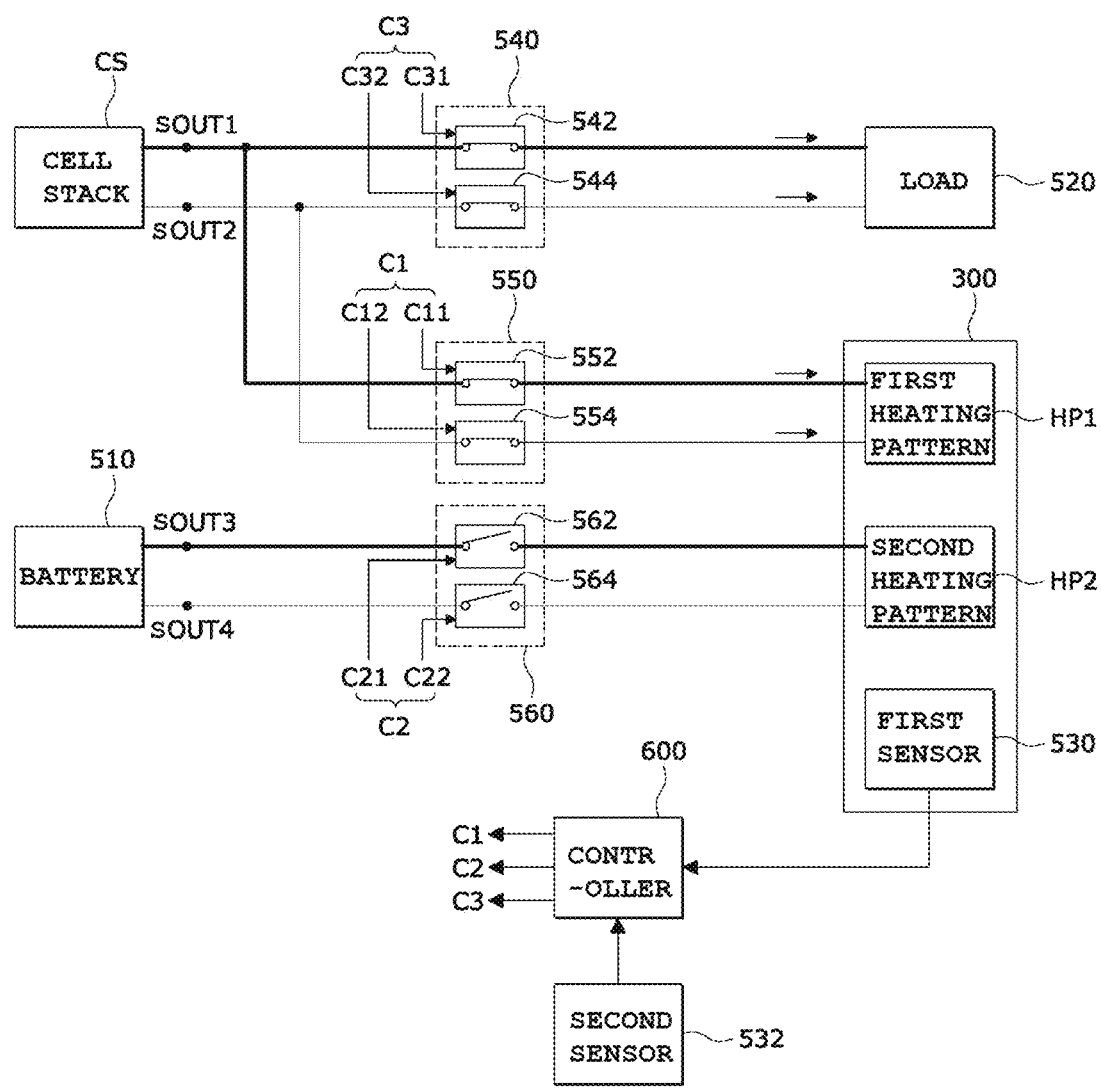
FIG. 10 is a block diagram of an embodiment of the fuel cell vehicle.

FIG. 10 is a block diagram of an embodiment 500A of the fuel cell vehicle 500.

The fuel cell vehicle 500A shown in FIG. 10 may include a cell stack CS, a battery 510, first and second switching units 550 and 560, a load 520, a heater assembly 300, and a controller 600. In addition, the fuel cell vehicle 500A may further include a third switching unit 540. In addition, the fuel cell vehicle 500A may further include at least one of a first sensor 530 or a second sensor 532.

Since the cell stack CS and the battery 510 respectively correspond to the cell stack CS and the battery 510 shown in FIG. 9, the same reference numerals are used to designate the same, and duplicate descriptions thereof have been omitted.

The load 520 may be any of various parts that require power generated by the cell stack CS in the fuel cell vehicle 500. For example, the load 520 may include a power system or a pump of the fuel cell vehicle 500.

The heater assembly 300 corresponds to each of the first and second heater assemblies 300A and 300B described above and may include first and second heating patterns HP1 and HP2. Therefore, the first and second heating patterns HP1 and HP2 shown in FIG. 10 respectively correspond to the first and second heating patterns HP1 and HP2 described above with reference to FIGS. 4-8, and thus duplicate descriptions thereof are omitted.

The first switching unit 550 is disposed between the first heating pattern HP1, which is one of the plurality of heating patterns, and the cell stack CS of the fuel cell 100 and is switched in response to a first control signal C1. To this end, the first switching unit 550 may include first and second switches (or relays) 552 and 554.

The first switch 552 has one terminal connected to one SOUT1 of the output terminals SOUT1 and SOUT2 of the cell stack CS and another terminal connected to the first heating pattern HP1. The first switch 552 is switched in response to a $1\text{-}1^{st}$ control signal C11. For better understanding, the other terminal of the first switch 552 is illustrated as being directly connected to the first heating pattern HP1. However, the other terminal of the first switch 552 may be connected to the $1\text{-}1^{st}$ power connector PC11 of the first heating pattern HP1 via the $1\_1^{st}$ power terminal PT11 shown in FIG. 4.

The second switch 554 has one terminal connected to the other SOUT2 of the output terminals SOUT1 and SOUT2 of the cell stack CS and another terminal connected to the first heating pattern HP1 and is switched in response to a $1\text{-}2^{nd}$ control signal C12. For better understanding, the other terminal of the second switch 554 is illustrated as being directly connected to the first heating pattern HP1. However, the other terminal of the second switch 554 may be connected to the $1\text{-}2^{nd}$ power connector PC12 of the first heating pattern HP1 via the $1\text{-}2^{nd}$ power terminal PT12 shown in FIG. 4.

The first control signal C1 may be generated such that the first switch 552 and the second switch 554 are simultaneously turned on or off.

The second switching unit 560 is disposed between the second heating pattern HP2, which is the other of the plurality of heating patterns, and the battery 510, and is switched in response to a second control signal C2. To this end, the second switching unit 560 may include third and fourth switches (or relays) 562 and 564.

The third switch 562 has one terminal connected to one SOUT3 of the output terminals SOUT3 and SOUT4 of the battery 510 and another terminal connected to the second heating pattern HP2 and is switched in response to a $2\text{-}1^{st}$ control signal C21. For better understanding, the other terminal of the third switch 562 is illustrated as being directly connected to the second heating pattern HP2. However, the other terminal of the third switch 562 may be connected to the $2\text{-}1^{st}$ power connector PC21 of the second heating pattern HP2 via the $2\text{-}1^{st}$ power terminal PT21 shown in FIG. 4.

The fourth switch 564 has one terminal connected to the other SOUT4 of the output terminals SOUT3 and SOUT4 of the battery 510 and another terminal connected to the second heating pattern HP2 and is switched in response to a $2\text{-}2^{nd}$ control signal C22. For better understanding, the other terminal of the fourth switch 564 is illustrated as being directly connected to the second heating pattern HP2. However, the other terminal of the fourth switch 564 may be connected to the $2\text{-}2^{nd}$ power connector PC22 of the second heating pattern HP2 via the $2\text{-}2^{nd}$ power terminal PT22 shown in FIG. 4.

The second control signal C2 may be generated such that the third switch 562 and the fourth switch 564 are simultaneously turned on or off.

The third switching unit 540 is disposed between the cell stack CS and the load 520 and is switched in response to a third control signal C3. To this end, the third switching unit 540 may include fifth and sixth switches (or relays) 542 and 544.

The fifth switch 542 has one terminal connected to one SOUT1 of the output terminals SOUT1 and SOUT2 of the cell stack CS and another terminal connected to the load 520 and is switched in response to a $3\text{-}1^{st}$ control signal C31.

The sixth switch 544 has one terminal connected to the other SOUT2 of the output terminals SOUT1 and SOUT2 of the cell stack CS and another terminal connected to the load 520 and is switched in response to a $3\text{-}2^{nd}$ control signal C32.

The third control signal C3 may be generated such that the fifth switch 542 and the sixth switch 544 are simultaneously turned on or off.

The controller 600 may generate at least one of the first to third control signals C1, C2, and C3 based on at least one of whether the fuel cell vehicle 500 starts to operate or is in a driven state (e.g., a traveling state, an idling state, or a shutdown state), the outside air temperature, or the internal temperature. Here, the outside air temperature may be the temperature of the air outside the fuel cell 100 or the temperature outside the cell stack CS. The internal temperature may be the temperature inside the cell stack CS.

When a cell located between the first end cell 122-1 and the $N^{th}$ end cell 122-N, which are located at respective ends of the cell stack 122 shown in FIG. 2, is referred to as an "intermediate cell", the first sensor 530 may measure the temperature of the first end cell 122-1 or the $N^{th}$ end cell 122-N and the temperature of the intermediate cell and may output the measured temperatures to the controller 600. To this end, the first sensor 530 may be disposed on the heating element 330 of the heater assembly 300, as shown in FIGS. 4-6, but the embodiments are not limited thereto.

In addition, the second sensor 532 may be disposed outside the cell stack CS to measure the outside air temperature and may output the measured temperature to the controller 600.

Figure 11:
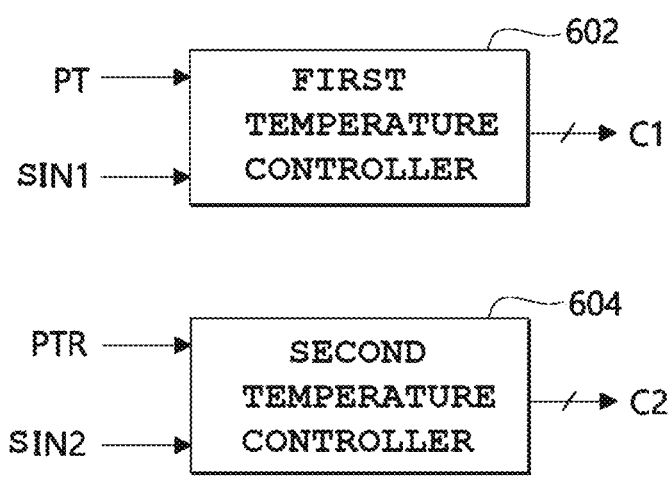
FIG. 11 is a block diagram of an embodiment of the controller shown in FIG. 10.

FIG. 11 is a block diagram of an embodiment 600A of the controller 600 shown in FIG. 10.

The controller 600 shown in FIG. 11 may include a first temperature controller 602 and a second temperature controller 604.

The first temperature controller 602 may determine whether the outside air temperature received from the second sensor 532 through the input terminal SIN1 is lower than a first predetermined temperature PT depending on the state of the fuel cell vehicle 500. The first temperature controller may generate the first control signal C1 based on the result of the determination and may output the first control signal C1 to the first switching unit 550. For example, the first predetermined temperature PT may be −10° C., but the embodiments are not limited thereto.

The second temperature controller 604 may receive the temperature of at least one of the first end cell 122-1 or the $N^{th}$ end cell 122-N and the temperature of the intermediate cell from the first sensor 530 through the input terminal SIN2 depending on the state of the fuel cell vehicle 500. The second temperature controller 604 may determine whether the temperature difference between at least one of the first end cell or the $N^{th}$ end cell and the intermediate cell falls outside a predetermined temperature range PTR, may generate the second control signal C2 based on the result of the determination, and may output the second control signal C2 to the second switching unit 560. For example, the predetermined temperature range may be 5° C. to 10° C., but the embodiments are not limited thereto.

Hereinafter, a method of controlling the temperature of the fuel cell vehicle according to an embodiment is described with reference to the accompanying drawings.

Figure 12:
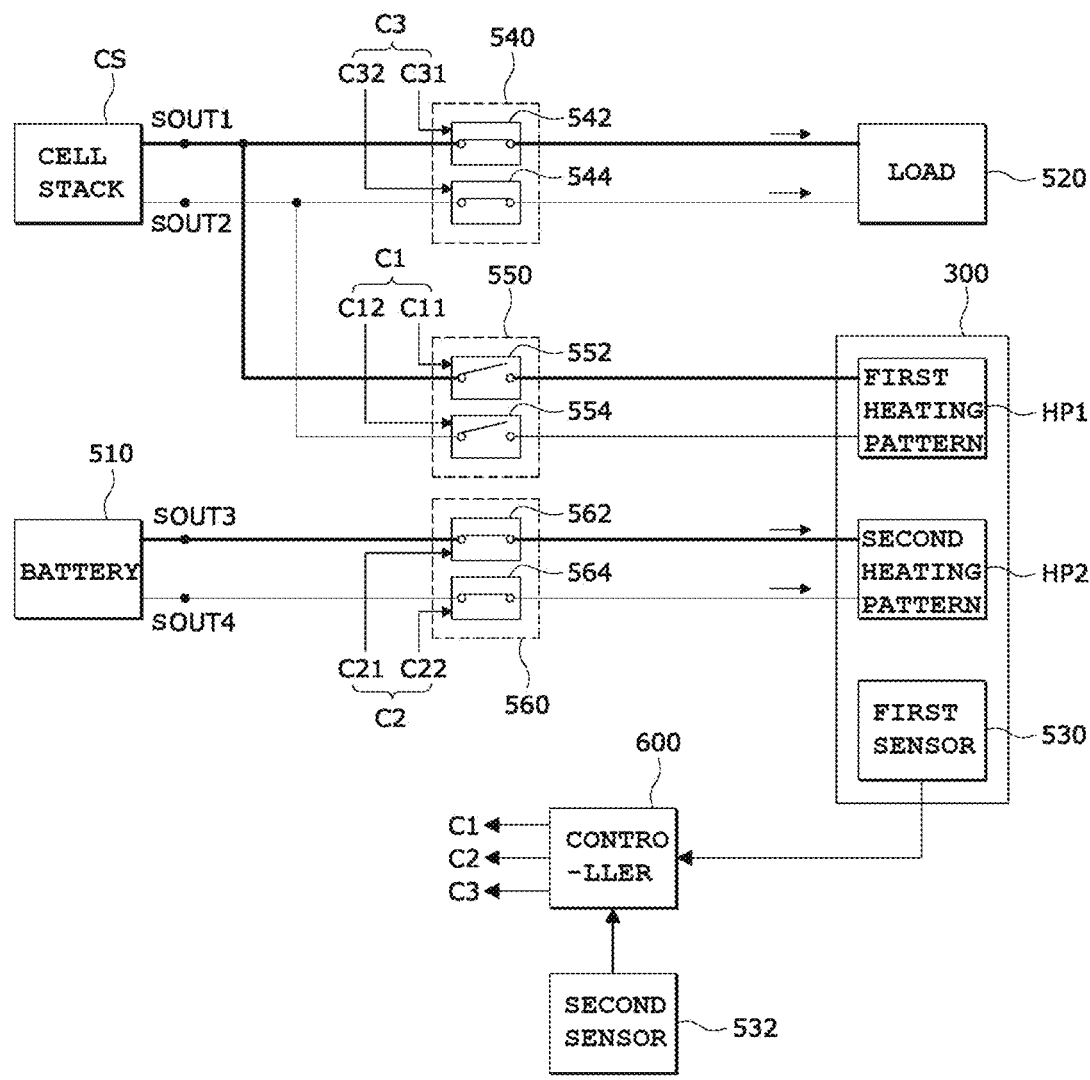
FIGS. 12 and 13 are block diagrams for explaining the operation of the fuel cell vehicle shown in FIG. 10.
Figure 13:
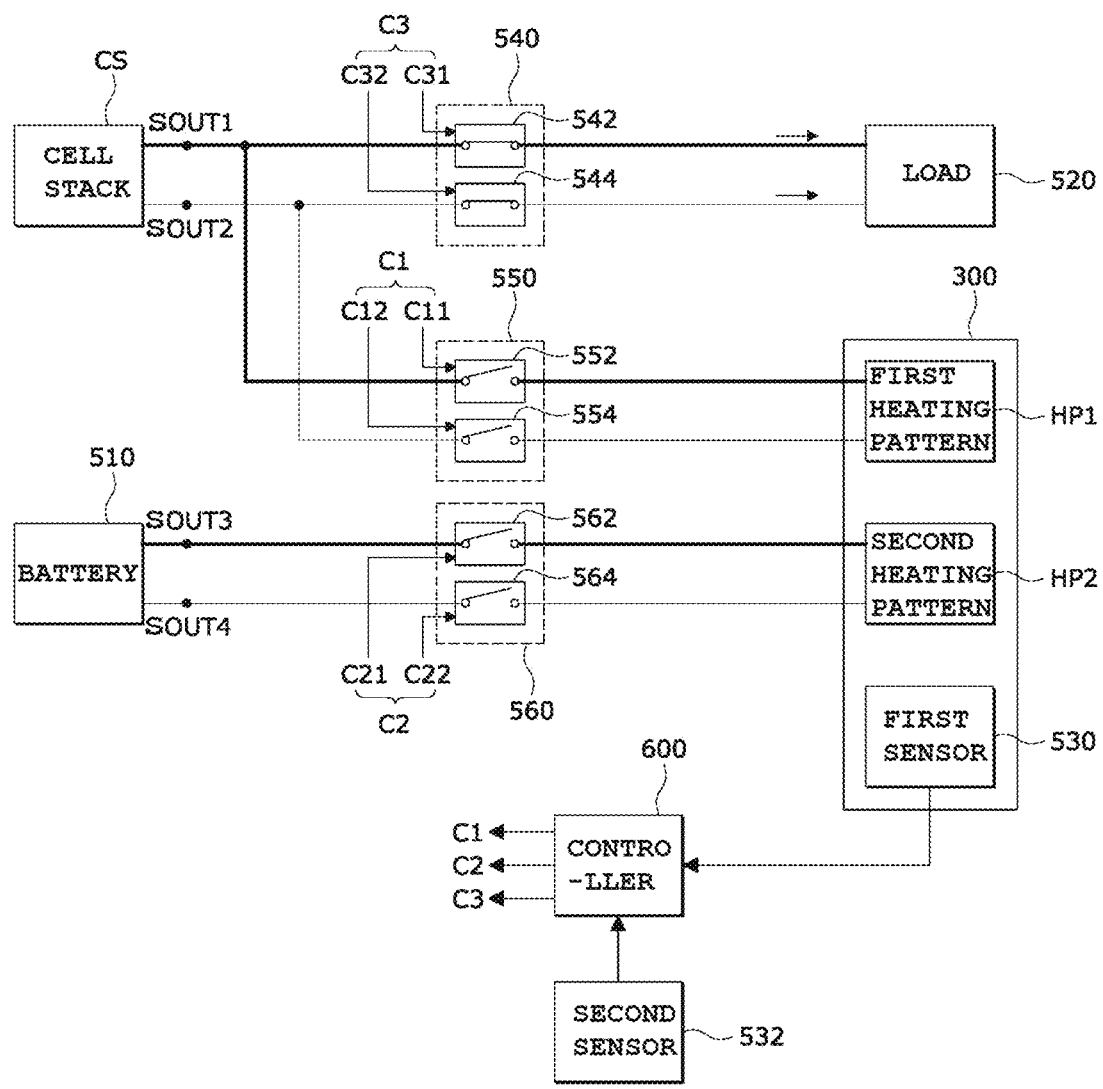

FIGS. 12 and 13 are block diagrams for explaining the operation of the fuel cell vehicle shown in FIG. 10. Since the fuel cell vehicle shown in FIGS. 12 and 13 has the same configuration as the fuel cell vehicle shown in FIG. 11, a duplicate description thereof has been omitted.

Figure 14:
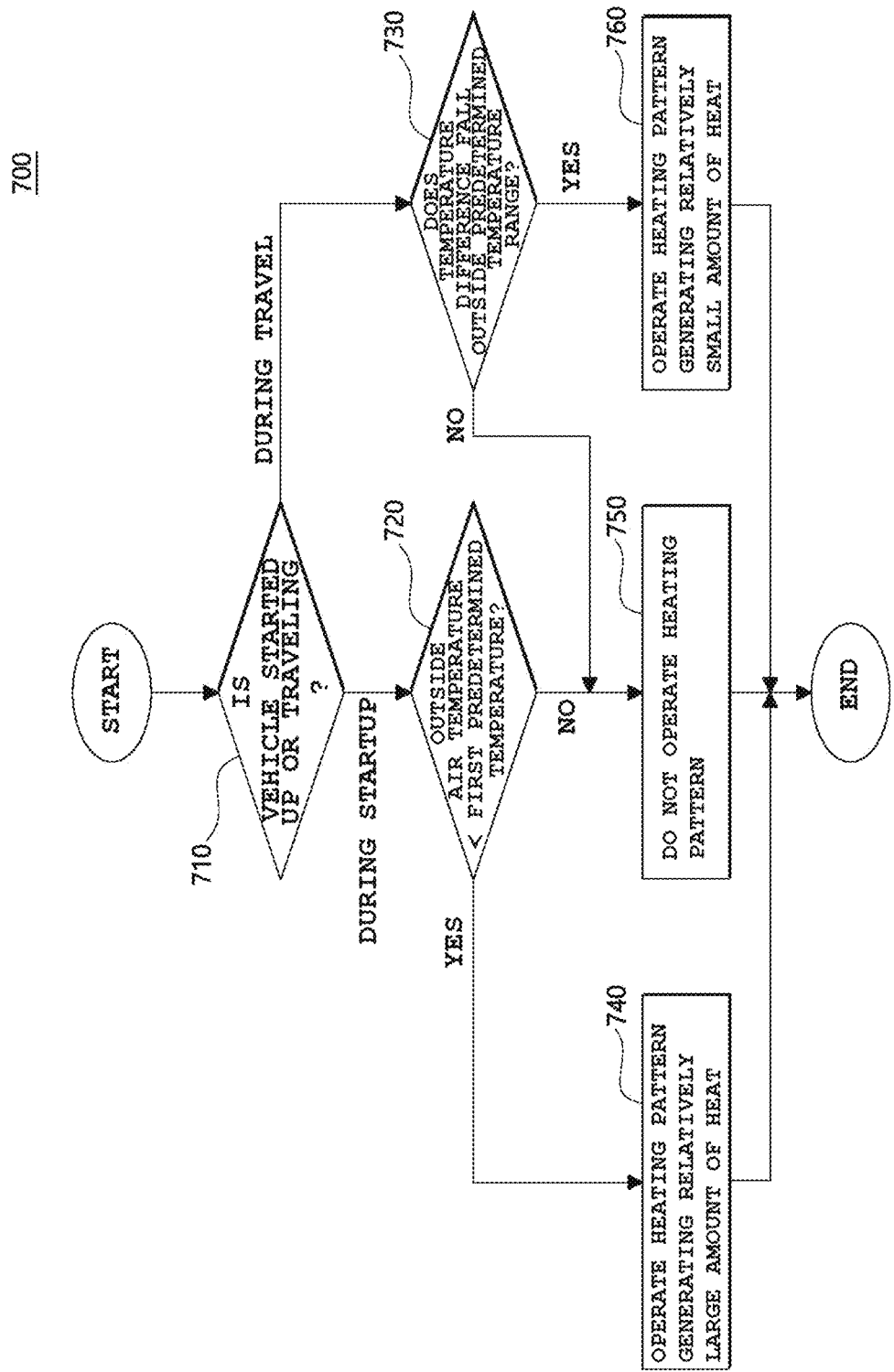
FIG. 14 is a flowchart for explaining a method of controlling the temperature of the fuel cell vehicle according to an embodiment.

FIG. 14 is a flowchart for explaining a method 700 of controlling the temperature of the fuel cell vehicle according to an embodiment.

The controller 600 determines whether the fuel cell vehicle 500 starts to operate (i.e., is being started up) or is traveling (step 710).

When the fuel cell vehicle 500 starts to operate, a determination as to whether the outside air temperature is lower than the first predetermined temperature is made (step 720). Step 720 may be performed by the first temperature controller 602 shown in FIG. 11.

If the outside air temperature is lower than the first predetermined temperature, a heating pattern generating a relatively large amount of heat among the plurality of heating patterns is operated (step 740). If the amount of heat generated by the first heating pattern HP1 is larger than the amount of heat generated by the second heating pattern HP2, the first heating pattern HP1 is operated. In this case, as shown in FIG. 10, the first and second switches 552 and 554 of the first switching unit 550 may be simultaneously turned on in response to the first control signal C1, whereby voltage may be supplied from the cell stack CS to the first heating pattern HP1, and thus the first heating pattern HP1 may be operated.

However, if the outside air temperature is not lower than the first predetermined temperature, the plurality of heating patterns is not operated (step 750).

According to an embodiment, when the fuel cell vehicle 500 is traveling, a determination as to whether the temperature difference falls outside the predetermined temperature range is made (step 730). Step 730 may be performed by the second temperature controller 604.

If the temperature difference falls outside the predetermined temperature range, a heating pattern generating a relatively small amount of heat among the plurality of heating patterns is operated (step 760). However, if the temperature difference does not fall outside the predetermined temperature range, the process proceeds to step 750.

Figure 15:
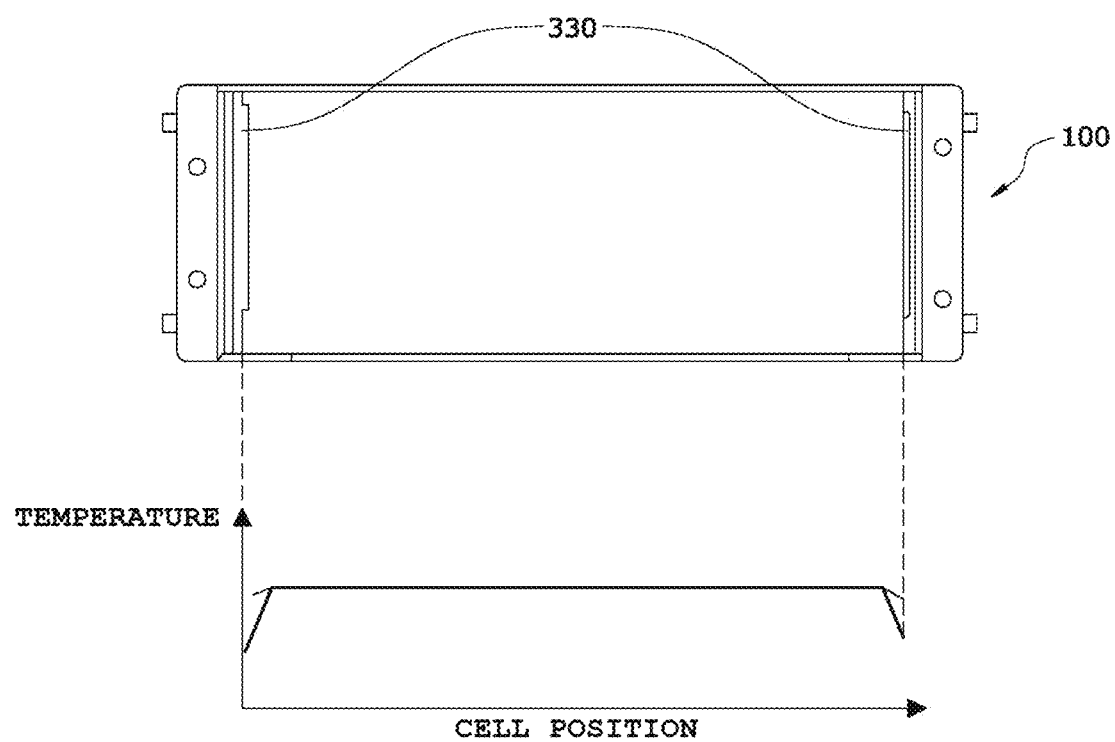
FIG. 15 is a diagram for explaining a change in the temperature of the cell stack in the fuel cell.

FIG. 15 is a diagram for explaining a change in the temperature of the cell stack 122 in the fuel cell 100.

Referring to FIG. 15, it can be seen that the temperatures of the first and $N^{th}$ end cells 122-1 and 122-N are lower than the temperature of the intermediate cell. Using this fact, in order to perform steps 730 and 760, the temperature of the coolant outlet (hereinafter referred to as a "first temperature") and the temperature of the first or $N^{th}$ end cell 122-1 or 122-N (hereinafter referred to as a "second temperature") may be sensed. In this case, in order to perform step 730, the first temperature and the second temperature may be compared with each other. In other words, when the first temperature is higher than the second temperature, as shown in FIG. 12, the third and fourth switches 562 and 564 of the second switching unit 560 may be turned on in response to the second control signal C2, whereby voltage may be supplied from the battery 510 to the second heating pattern HP2, and thus the second heating pattern HP2 may be operated.

For example, a third sensor (not shown) for measuring the first temperature may be separately disposed outside the cell stack CS, and the second temperature may be obtained using the temperature measured by the first sensor 530.

However, when the first temperature is equal to or lower than the second temperature, as shown in FIG. 13, the third and fourth switches 562 and 564 of the second switching unit 560 may be turned off in response to the second control signal C2, whereby the supply of voltage from the battery 510 to the second heating pattern HP2 may be interrupted, and thus generation of heat by the second heating pattern HP2 may be stopped.

According to another embodiment, when the fuel cell vehicle 500 is traveling, a determination as to whether the outside air temperature is equal to or lower than the second predetermined temperature, e.g., 10° C., may be made (step 730). If the outside air temperature is equal to or lower than the second predetermined temperature, a heating pattern generating a relatively small amount of heat among the plurality of heating patterns is operated (step 760). However, if the outside air temperature is higher than the second predetermined temperature, the process proceeds to step 750.

Referring to FIGS. 10, 12, and 13, the third switching unit 540 is turned on in response to the third control signal C3 regardless of the operation of the first switching unit 550 and the second switching unit 560, whereby power may be supplied from the cell stack CS to the load 520.

In addition, as shown in FIG. 10, the second switching unit 560 is turned off while voltage is supplied to the first heating pattern HP1.

In addition, as shown in FIGS. 12 and 13, the first switching unit 550 is turned off while voltage is supplied to the second heating pattern HP2, or while the supply of voltage thereto is interrupted.

Hereinafter, a fuel cell according to a comparative example, the fuel cell according to the embodiment, and the fuel cell vehicle including the same is described with reference to the accompanying drawings.

A heating element included in a fuel cell according to a comparative example has only one heating pattern. When the one heating pattern receives voltage from the cell stack CS, the heating pattern may quickly raise the temperature of the cell stack when the outside air temperature is low. However, even when only a lower voltage than the voltage supplied from the cell stack is necessary to raise the temperature of the cell stack while the vehicle is traveling, the heating pattern is operated using the voltage received from the cell stack, which is higher than necessary. In other words, a large amount of voltage from the cell stack is unnecessarily consumed, thereby temporarily increasing power loss of the fuel cell vehicle.

In addition, when the one heating pattern according to the comparative example receives voltage from the battery 510, it may be difficult to quickly raise the temperature of the cell stack when the outside air temperature is low.

In contrast, according to the embodiments of the present disclosure, the fuel cell has a plurality of heating patterns generating different amounts of heat. When the outside air temperature is low, a heating pattern generating a relatively large amount of heat is operated in order to quickly raise the temperature of the cell stack. For example, when the outside air temperature is lower than −10° C., the first heating pattern HP1 generates heat of minimum 500 W or greater, thereby raising the temperature of the cell stack CS within about 1 minute. In addition, when it is intended to raise the temperature of the cell stack during operation in the cold, in which the outside air temperature is lower than 10° C., a heating pattern generating a relatively small amount of heat is operated using the voltage supplied from the battery 510, thereby not only minimizing the temperature difference between the end cell and the intermediate cell but also reducing the consumption of power generated in the cell stack.

In addition, when the amount of heat generated by the first heating pattern HP1 is greater than the amount of heat generated by the second heating pattern HP2, the configuration shown in FIG. 4, in which the first heating pattern HP1 is disposed in the edge portion of the insulating base IB so as to surround the second heating pattern HP2, may be advantageous compared to the configuration shown in FIG. 5. This is because the edge portion of the reaction surface is prevented from freezing and bursting when the vehicle is started up at a low outside air temperature (i.e. during cold startup).

In addition, when the amount of heat generated by the first heating pattern HP1 is greater than the amount of heat generated by the second heating pattern HP2, the configuration shown in FIG. 5, in which the second heating pattern HP2 is disposed in the edge portion of the insulating base IB so as to surround the first heating pattern HP1, may be advantageous compared to the configuration shown in FIG. 4. This is because the occurrence of condensation on the reaction surface is prevented during cold driving.

In addition, when the first and second heating patterns HP1 and HP2 are implemented as shown in FIG. 6, the heat generated from the first and second heating patterns HP1 and HP2 may be uniformly transferred to the cell stack CS.

In the case in which two first heater assemblies 300A and two second heater assemblies 300B are provided, wiring and the configurations of connectors may become complicated, and planar heating elements may become thermal barriers. However, according to the embodiment, although a single first heater assembly 300A or a single second heater assembly 300B is provided, since the heating element included in the single heater assembly is provided with a plurality of heating patterns generating different amounts of heat, it is possible to solve the above problems.

As should be apparent from the above description, according to the fuel cell, the fuel cell vehicle including the same, and the method of controlling the temperature of the vehicle of the embodiments, it is possible to quickly raise the temperature of the cell stack during startup when the outside air temperature is low. In addition, it is possible not only to minimize the temperature difference between the end cell and the intermediate cell but also to reduce the consumption of power generated in the cell stack by raising the temperature of the cell stack while the vehicle is traveling.

However, the effects achievable through the disclosure are not limited to the above-mentioned effects, and other effects not mentioned herein should be clearly understood by those of ordinary skill in the art from the above description.

The above-described various embodiments may be combined with each other without departing from the scope of the present disclosure unless they are incompatible with each other. In addition, for any element or process that is not described in detail in any of the various embodiments, reference may be made to the description of an element or a process having the same reference numeral in another embodiment, unless otherwise specified.

While the present disclosure has been particularly shown and described with reference to embodiments thereof, these embodiments are only proposed for illustrative purposes, and do not restrict the present disclosure. It should be apparent to those of ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   a plate disposed at at least one of two opposite ends of the cell stack; and
   a heating element disposed between the plate and the at least one of the two opposite ends of the cell stack,
   wherein the heating element comprises a plurality of heating patterns generating heat separately from each other at different temperatures, and
   wherein the plate comprises a plurality of power terminals connected to respective ones among the plurality of heating patterns.

2. The fuel cell according to claim 1, wherein at least one of the plurality of heating patterns has a serpentine shape.

3. The fuel cell according to claim 2, wherein each of the plurality of heating patterns has a portion extending in a horizontal direction and a portion extending in a vertical direction,
 wherein the portion extending in the horizontal direction has a greater length than the portion extending in the vertical direction, and
 wherein each of the horizontal direction and the vertical direction intersects the first direction.

4. The fuel cell according to claim 2, wherein each of the plurality of heating patterns has a portion extending in a vertical direction and a portion extending in a horizontal direction,
 wherein the portion extending in the vertical direction has a greater length than the portion extending in the horizontal direction, and
 wherein each of the horizontal direction and the vertical direction intersects the first direction.

5. The fuel cell according to claim 1, wherein the plurality of heating patterns comprises a first heating pattern and a second heating pattern, and
 wherein the first heating pattern is surrounded by the second heating pattern.

6. The fuel cell according to claim 5, wherein the plurality of power terminals comprises:
 a first power terminal connected to the first heating pattern; and
 a second power terminal connected to the second heating pattern.

7. The fuel cell according to claim 5, wherein the first heating pattern generates a larger amount of heat than the second heating pattern.

8. The fuel cell according to claim 5, wherein the second heating pattern generates a larger amount of heat than the first heating pattern.

9. The fuel cell according to claim 6, wherein the heating element comprises an insulating base having the plurality of heating patterns formed thereon.

10. The fuel cell according to claim 9, wherein the first heating pattern comprises:
 a first conductive line formed on the insulating base;
 a 1-1st power connector located at one end of the first conductive line; and
 a 1-2nd power connector located at another end of the first conductive line, and
 wherein the second heating pattern comprises:
 a second conductive line formed on the insulating base so as to be spaced apart from the first conductive line;
 a 2-1st power connector located at one end of the second conductive line; and
 a 2-2nd power connector located at another end of the second conductive line.

11. The fuel cell according to claim 10, wherein the plate comprises:
 a 1-1st terminal connected to the 1-1st power connector;
 a 1-2nd terminal connected to the 1-2nd power connector;
 a 2-1st terminal connected to the 2-1st power connector; and
 a 2-2nd terminal connected to the 2-2nd power connector.

12. The fuel cell according to claim 10, wherein the 1-1st power connector, the 1-2nd power connector, the 2-1st power connector, and the 2-2nd power connector are disposed on a portion of the insulating base.

13. The fuel cell according to claim 11, wherein the first power terminal comprises:
 a 1-1st power terminal connected to the 1-1st terminal; and
 a 1-2nd power terminal connected to the 1-2nd terminal, and
 wherein the second power terminal comprises:
 a 2-1st power terminal connected to the 2-1st terminal; and
 a 2-2nd power terminal connected to the 2-2nd terminal.

14. The fuel cell according to claim 12, wherein one of the 1-1st power connector and the 1-2nd power connector and one of the 2-1st power connector and the 2-2nd power connector are disposed on an upper side of the portion of the insulating base, and
 wherein a remaining one of the 1-1st power connector and the 1-2nd power connector and a remaining one of the 2-1st power connector and the 2-2nd power connector are disposed on a lower side of the portion of the insulating base.

15. The fuel cell according to claim 12, wherein the 1-1st power connector, the 1-2nd power connector, the 2-1st power connector, and the 2-2nd power connector are disposed on a center of the portion of the insulating base.

16. A fuel cell vehicle, comprising:
 the fuel cell of claim 1;
 a battery configured to supply a voltage having a lower level than a voltage supplied from the cell stack;
 a first switching unit disposed between a first heating pattern and the cell stack of the fuel cell and configured to be switched in response to a first control signal, the first heating pattern being one of the plurality of heating patterns;
 a second switching unit disposed between a second heating pattern and the battery and configured to be switched in response to a second control signal, the second heating pattern being another one of the plurality of heating patterns; and
 a controller configured to generate the first control signal and the second control signal based on a state of the fuel cell vehicle, the state being at least one of whether the fuel cell vehicle is started up or is traveling, an outside air temperature, or a temperature inside the cell stack.

17. The fuel cell vehicle according to claim 16, wherein the cell stack comprises:
 first and second end cells respectively located at two opposite ends thereof; and
 an intermediate cell located between the first and second end cells, and
 wherein the controller comprises:
 a first temperature controller configured to make a determination as to whether the outside air temperature is lower than a predetermined temperature depending on the state of the fuel cell vehicle and to generate the first control signal based on a result of the determination; and
 a second temperature controller configured to make a determination as to whether a temperature difference between at least one of the first or second end cell and the intermediate cell falls outside a predetermined temperature range depending on the state of the fuel cell vehicle and to generate the second control signal based on a result of the determination.

18. The fuel cell vehicle according to claim 16, further comprising:
 a first sensor disposed on the heating element and configured to measure a temperature of the first or second end cell; and
 a second sensor disposed outside the cell stack and configured to measure the outside air temperature.

19. The fuel cell vehicle according to claim 17, wherein the predetermined temperature is −10° C., and the predetermined temperature range is 5° C. to 10° C.

20. A method of controlling a temperature of the fuel cell vehicle of claim 17, the method comprising:
- determining as the state of the fuel cell vehicle whether the fuel cell vehicle is started up or is traveling;
- operating a heating pattern generating a relatively large amount of heat among the plurality of heating patterns when the fuel cell vehicle is started up and when the outside air temperature is lower than the predetermined temperature; and
- operating a heating pattern generating a relatively small amount of heat among the plurality of heating patterns when the fuel cell vehicle is traveling and when the temperature difference falls outside the predetermined temperature range.

* * * * *